United States Patent
Balzaretti et al.

(10) Patent No.: US 6,252,765 B1
(45) Date of Patent: Jun. 26, 2001

(54) DEVICE BAY RETENTION MECHANISM

(75) Inventors: David M. Balzaretti, Olympia, WA (US); Michael K. Goodman, Thornton, CO (US); Paul C. Van Note, University Place, WA (US); Ron D. Egger; Chris H. Hanes, both of Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/221,830

(22) Filed: Dec. 29, 1998

(51) Int. Cl.[7] ....................................... G06F 1/16
(52) U.S. Cl. ................. 361/683; 361/684; 361/685; 361/686
(58) Field of Search ..................... 361/683–686

(56) References Cited

U.S. PATENT DOCUMENTS 5,757,616 * 5/1998 May et al. ....................... 361/683

OTHER PUBLICATIONS

Compaq, Intel, Microsoft, "Device Bay Interface Specification," Revision 0.85, (Feb. 6, 1998).

* cited by examiner

Primary Examiner—Leo P. Picard
Assistant Examiner—Yean-Hsi Chang
(74) Attorney, Agent, or Firm—Kenyon & Kenyon

(57) ABSTRACT

A computer peripheral device retention apparatus is disclosed. In one embodiment, the apparatus includes a frame, a control arm slidably coupled to the frame, and first and second locking arms operably coupled to the control arm. A release button is received within the frame and is in operable association with the control arm. A release trigger arm is pivotally attached to the frame and a control arm latch is connected to the control arm at a first end and is releasably coupled to the release trigger arm at a second end. An ejection mechanism is attached to a rear end of the frame. A backplane printed circuit board is also attached to the rear end of the frame and an electrical control system is coupled to the backplane printed circuit board. A solenoid assembly is coupled to the electrical control system and is releasably coupled to the control arm.

22 Claims, 8 Drawing Sheets

DEVICE BAY RETENTION MECHANISM

BACKGROUND OF THE INVENTION

The present invention relates to an apparatus and method for retaining a computer peripheral device within a computer chassis. More specifically, the invention provides for retaining a peripheral device within a computer chassis such that the device may be easily installed within the computer and easily removed and replaced with another peripheral device.

Currently, peripheral devices, e.g., hard disk drives, modems, network adapters, and CD drives, are installed and mounted within a computer chassis by utilizing hardware, such as screws, to secure the device to the chassis. As can be seen in FIGS. 1 and 2, peripheral device 1010, which could be a floppy disk drive, and device 1020, which could be a CD-ROM drive, are fixedly secured within a traditional computer tower. Peripheral device 1020 is secured to a traditional peripheral bay 1030 by utilizing mounting hardware 1032, such as screws. Peripheral device 1010 is also secured within computer 1000 by using screw-type hardware.

Whereas current mounting methods securely mount peripheral devices within a computer, they do not allow an installer to easily remove a peripheral device and replace it with another peripheral device. Currently, the installer must open the computer chassis to gain access to the mounting hardware. This requirement to open the chassis to install/remove a peripheral device does not allow for easy change-out of devices. Therefore, it would be desirable to provide for an improved apparatus and method for retaining a peripheral device within a computer chassis.

Device Bay Interface Specification, Revision 0.85 dated Feb. 6, 1998, is an industry specification that defines peripheral device form factors for easily adding and upgrading computer peripheral devices without requiring opening of the computer chassis. However, the specification does not define specific designs for a retention mechanism to meet the form factors defined in the specification. The present invention provides a retention mechanism for retaining a peripheral device within a computer chassis in view of the Device Bay specification.

SUMMARY OF THE INVENTION

In accordance with an embodiment of the present invention, a computer peripheral device retention apparatus is provided. The apparatus includes a frame, a control arm slidably coupled to the frame, and first and second locking arms operably coupled to the control arm. A release button is received within the frame and is in operable association with the control arm. A release trigger arm is pivotally attached to the frame and a control arm latch is connected to the control arm at a first end and is releasably coupled to the release trigger arm at a second end. An ejection mechanism is attached to a rear end of the frame. A backplane printed circuit board is also attached to the rear end of the frame and an electrical control system is coupled to the backplane printed circuit board. A solenoid assembly is coupled to the electrical control system and is releasably coupled to the control arm.

DETAILED DESCRIPTION

Figure 1:
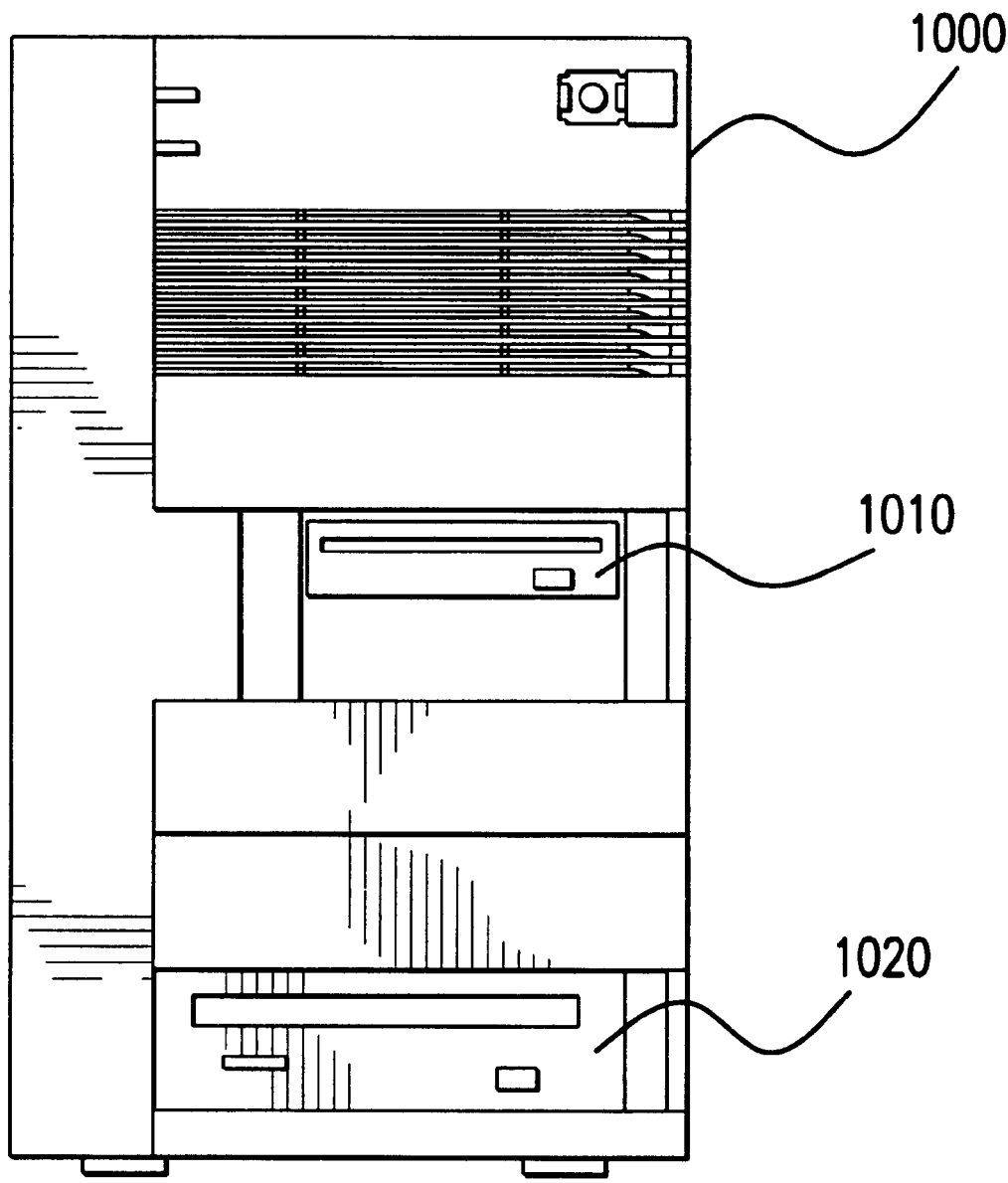
FIG. 1 is a front view of a prior art mounting arrangement for mounting peripheral devices within a computer.
Figure 2:
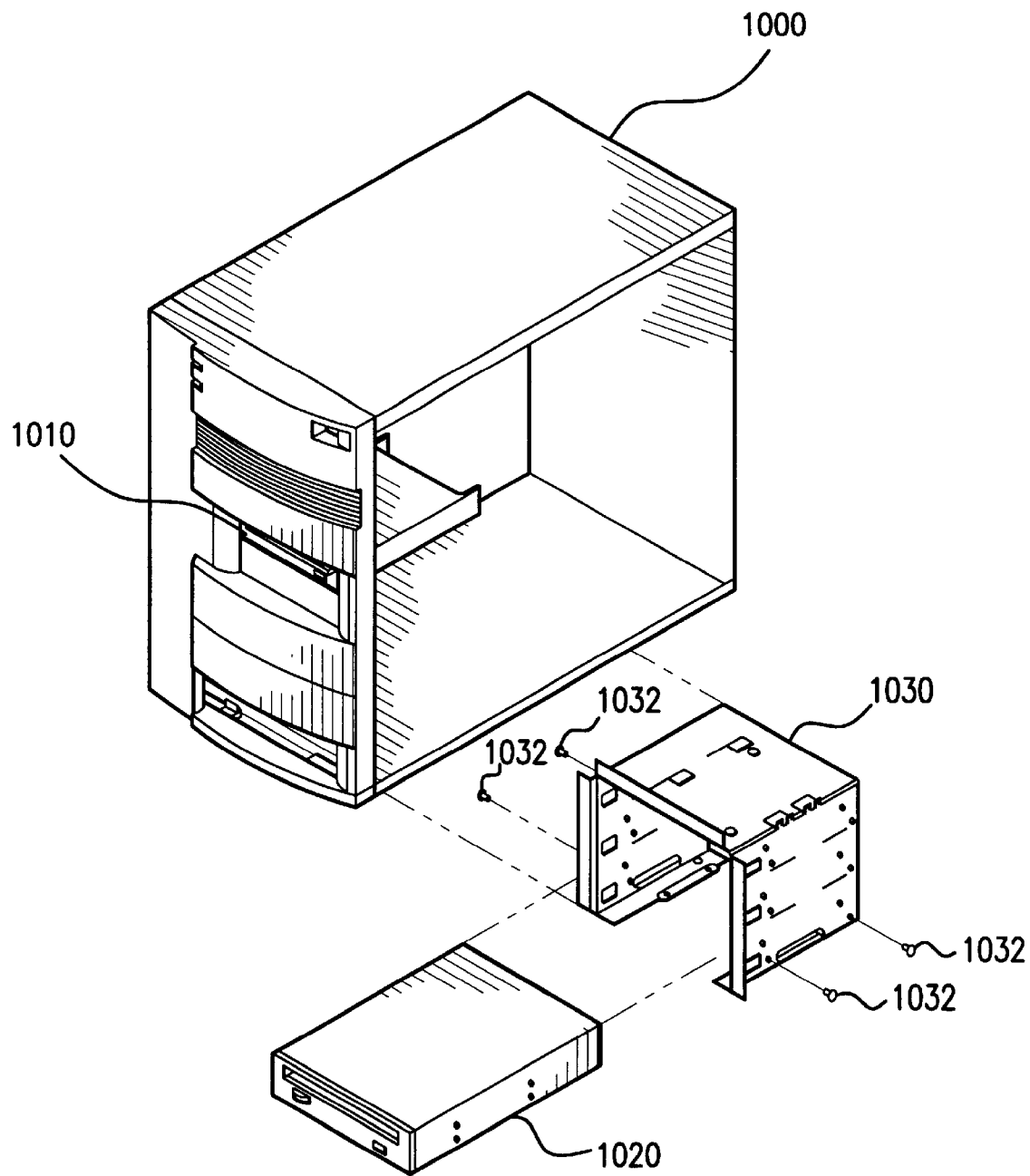
FIG. 2 is an exploded perspective view of the prior art mounting arrangement of FIG. 1.
Figure 3:
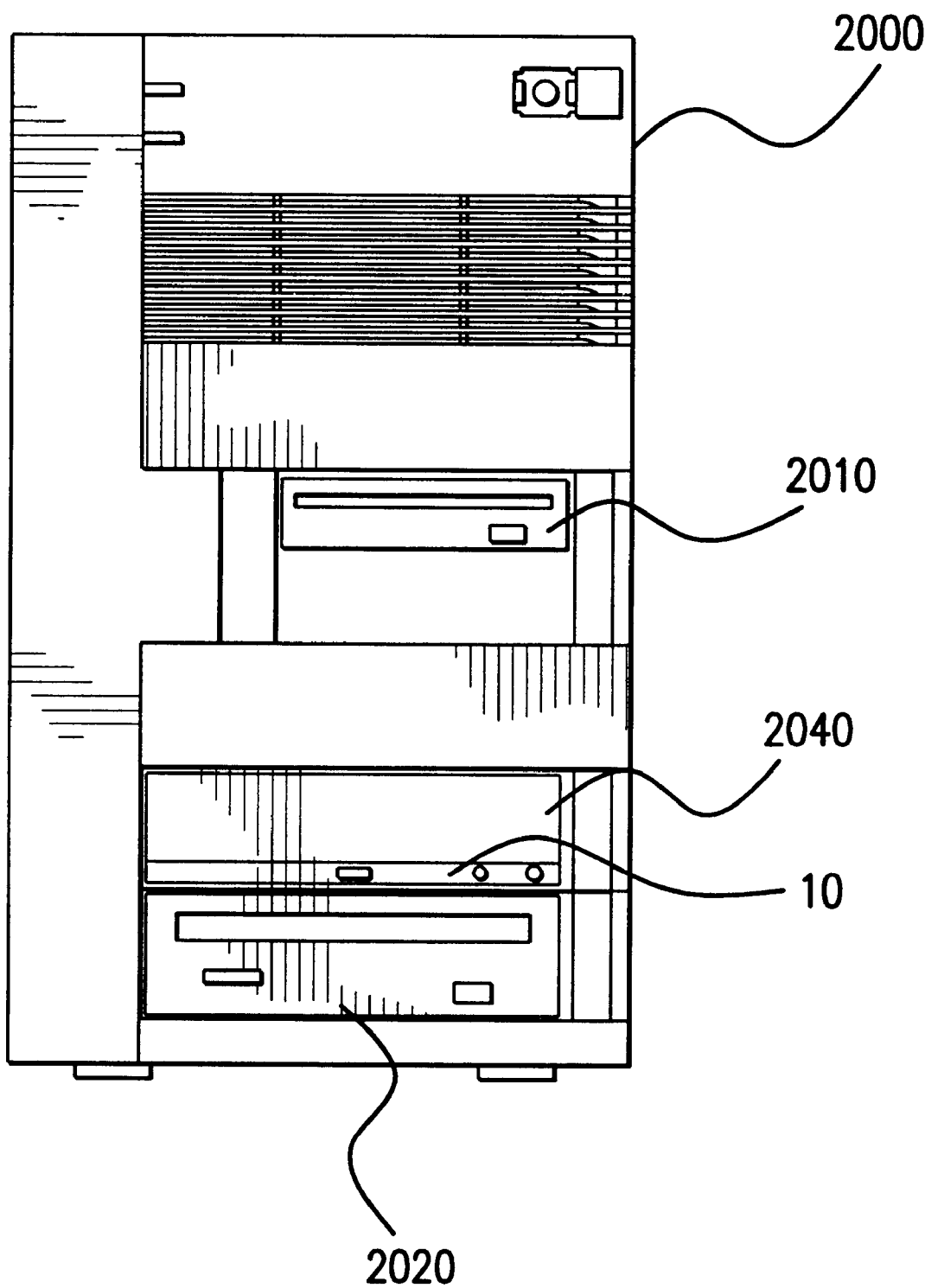
FIG. 3 is a front view of an embodiment of a device bay retention mechanism as installed within a computer in accordance with the present invention.
Figure 4:
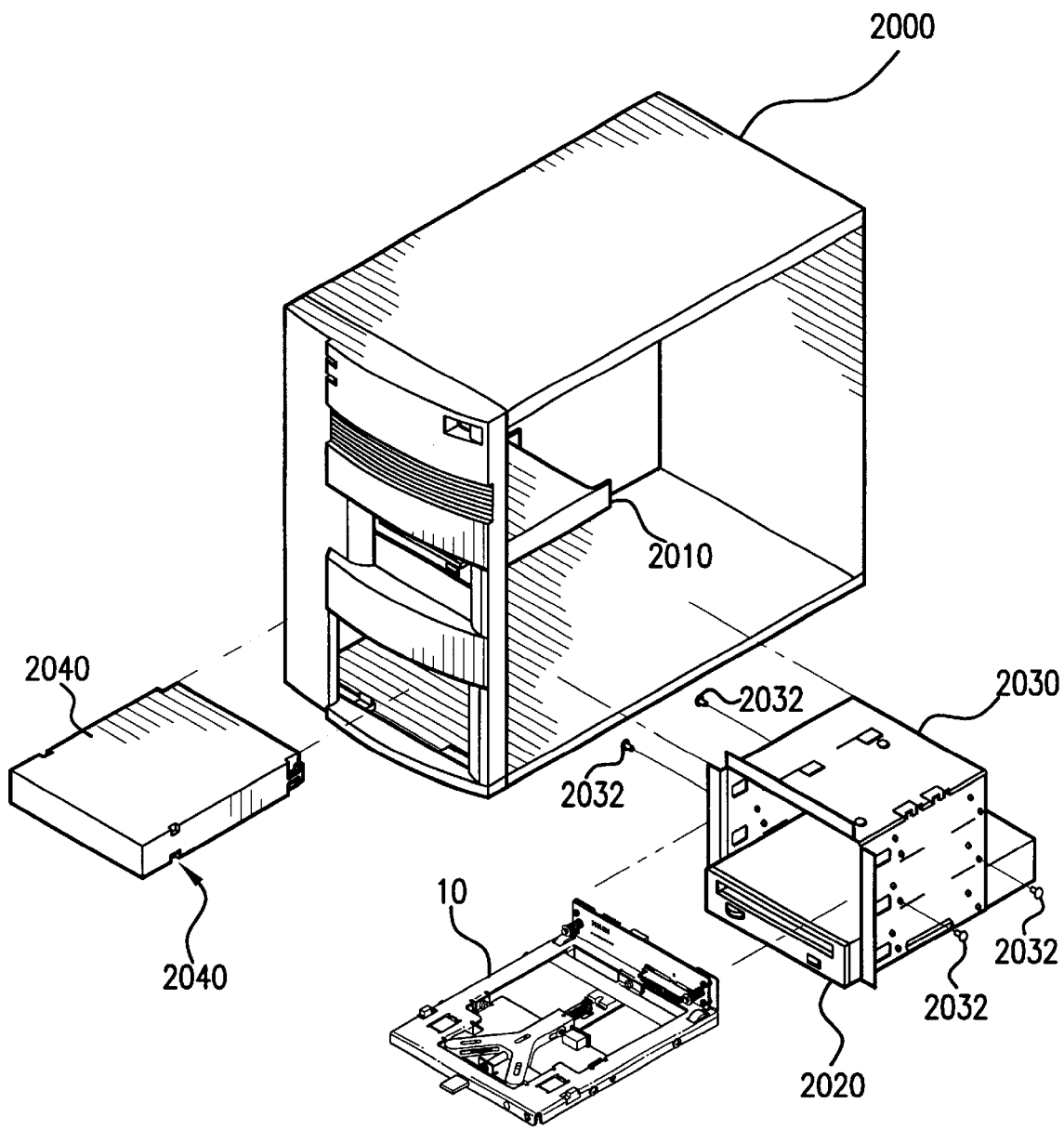
FIG. 4 is an exploded perspective view of the computer with the device bay retention mechanism of FIG. 3.

FIGS. 3 and 4 illustrate an embodiment of the device bay retention mechanism 10 of the present invention. Referring to FIG. 3, device bay retention mechanism 10 removably secures a device bay peripheral 2040, which is illustrated as a CD-ROM device, within a computer 2000 such that device bay peripheral 2040 may be removed from computer 2000 and replaced with another peripheral device without requiring the installer to open the computer chassis and utilize tools to remove device bay peripheral 2040 from computer 2000. This is in contrast to the other fixedly-installed peripheral devices 2010 and 2020 that are illustrated in FIG. 3. Fixed peripheral devices 2010 and 2020 are secured within computer 2000 such that they can only be removed and replaced with other peripheral devices by opening the chassis and removing mounting hardware that secures the peripheral devices within computer 2000. Thus, whereas fixed peripheral devices 2010 and 2020 can only be removed from computer 2000 and replaced with other peripheral devices by opening the chassis and utilizing tools to remove and replace the peripherals, device bay retention mechanism 10 allows for removably installing device bay peripheral device 2040 within computer 2000 without requiring opening of the chassis and utilizing tools.

FIG. 4 is an exploded perspective view of device bay retention mechanism 10 as it is installed within computer 2000. For purposes of clarity the side cover of computer 2000 has been removed and is not illustrated. Device bay retention mechanism 10 is adapted to be secured within a device bay 2030. Device bay retention mechanism 10 is secured within device bay 2030 by utilizing mounting hardware 2032, which can be, for example, screws. Thus, device bay retention mechanism 10 is fixedly secured within device bay 2030. Device bay 2030 is a modified 5¼ inch peripheral bay. Device bay 2030 is modified such that it is slightly wider than a conventional 5¼ inch peripheral bay so that the locking arms of device bay retention mechanism 10 can be extended from, and retracted into, device bay retention mechanism 10 in order to unlock and lock, respectively, device bay peripheral 2040 within device bay retention mechanism 10, as will be further explained later in this specification. Device bay 2030 is installed within computer 2000.

Figure 5:
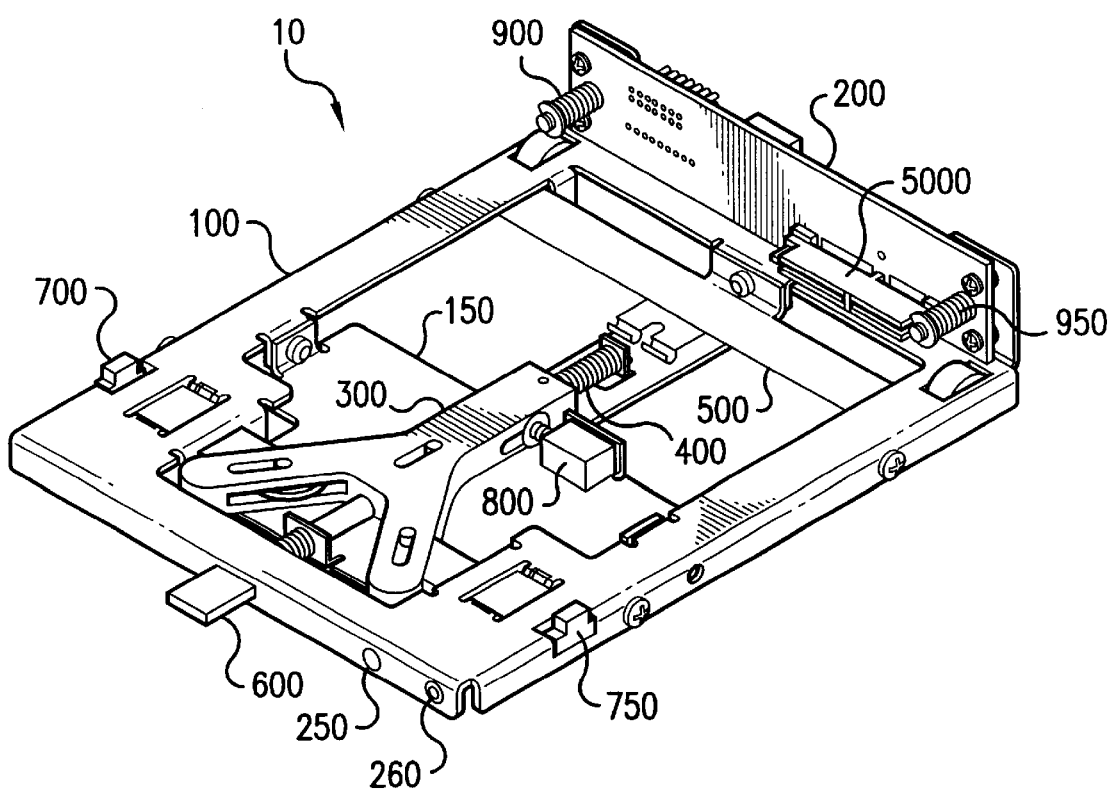
FIG. 5 is a perspective view of the embodiment of FIGS. 3 and 4 for the device bay retention mechanism.

FIG. 5 illustrates a perspective view of an embodiment of device bay retention mechanism 10. A general description of the components of device bay retention mechanism 10 will be provided by referring to FIG. 5 and a more detailed description of the components of device bay retention mechanism 10 will be provided when discussing FIG. 6. As can be seen in FIG. 5, device bay retention mechanism 10 includes a support frame 100 and a base frame 150. Base frame 150 is fixedly secured to support frame 100 and both frames 100 and 150 support the other components of device bay retention mechanism 10.

Attached to the rear end of support frame 100 is a device bay backplane printed circuit board (PCB) assembly 200. Device bay backplane printed circuit board assembly 200 electrically connects, by means of a device bay connector 5000, the peripheral device that is retained within device bay retention mechanism 10 to the computer. Device bay backplane PCB assembly 200 also is capable of communicating with device bay retention mechanism 10 in order to control the operation of solenoid assembly 800, as will be further explained later in this specification.

Y-shaped arm 300 is slidably supported within frames 100 and 150. Control arm latch 400 is rigidly connected to Y-shaped arm 300 at a first end and is releasably connectable to release trigger arm 500 at an opposite end. Release trigger arm 500 is pivotally mounted within support frame 100. Release button 600 is slidably received within support frame 100 at the end of support frame 100 that extends out from the front of the computer chassis. Release button 600 contacts Y-shaped arm 300 and is used to move Y-shaped arm within device bay retention mechanism 10. First locking arm 700 and second locking arm 750 are slidably mounted within support frame 100 and are operably associated with Y-shaped arm 300. As will become more clear later in this specification, the movement of Y-shaped arm 300 both locks and unlocks locking arms 700 and 750 with respect to a peripheral device inserted into retention mechanism 10.

Solenoid assembly 800 is mounted onto base frame 150 and is operably associated with Y-shaped arm 300. Solenoid assembly 800 contains a shaft that extends into Y-shaped arm 300 in order to lock the Y-shaped arm into its locked configuration when a peripheral device has been inserted into device bay retention mechanism 10. The shaft of solenoid assembly 800 is partially retracted from Y-shaped arm 300 in order to permit movement of Y-shaped arm 300 when the user desires to remove the peripheral device from device bay retention mechanism 10. In one embodiment, solenoid assembly 800 is connected to an electrical circuit that includes request switch 250. As will be further explained later in this specification, when an operator desires to remove a peripheral device from device bay retention mechanism 10, the operator depresses request switch 250 which in-turn sends a signal to solenoid assembly 800 to partially retract the shaft of solenoid assembly 800 from Y-shaped arm 300. Light-emitting diode (LED) 260 provides an indication for the operator when the shaft of solenoid assembly 800 has been retracted from Y-shaped arm 300.

A first ejection mechanism 900 and a second ejection mechanism 950 are installed at the rear, or internal end, of device bay retention mechanism 10. First and second ejection mechanisms 900, 950, respectively, serve to eject a peripheral device from device bay retention mechanism 10 when the user desires to remove the peripheral device from the computer.

Figure 6:
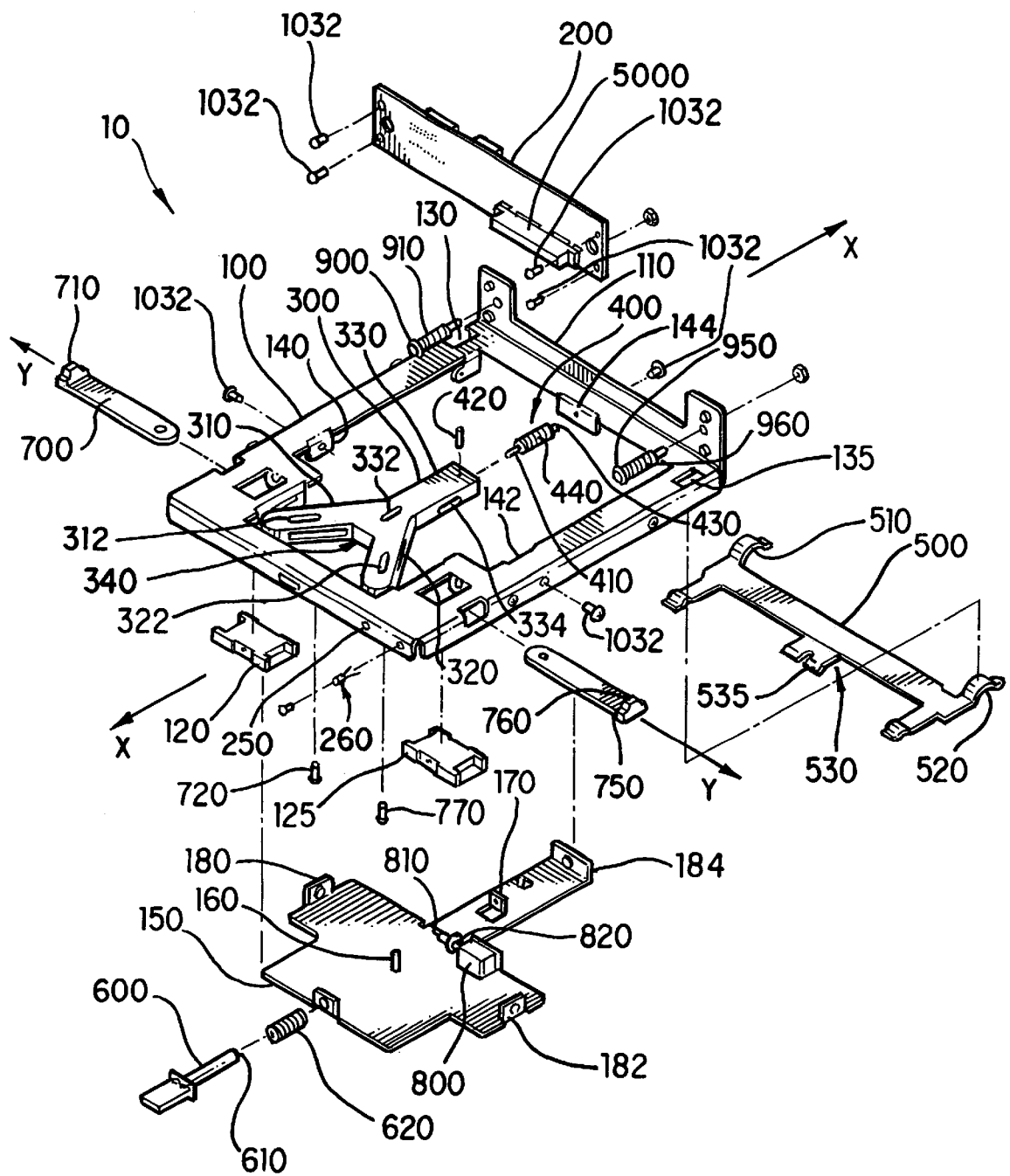
FIG. 6 is an exploded perspective view of the device bay retention mechanism of FIG. 5.

A more detailed description of the components of device bay retention mechanism 10 will now be provided. FIG. 6 illustrates an exploded, perspective view of an embodiment for device bay retention mechanism 10. As can be seen, and as was described previously, support frame 100 and base frame 150 are rigidly secured together. Mounting tabs 180, 182, and 184 of base frame 150 align with mounting tabs 140, 142, and 144 of support frame 100, respectively, and mounting hardware 1032 is utilized to secure base frame 150 to support frame 100. Device bay backplane PCB assembly 200 is secured to the rear structure 110 of support frame 100 by utilizing standard mounting hardware 1032.

Y-shaped arm 300 includes a first locking member 310, a second locking member 320, and a latch member 330. First locking member 310, second locking member 320, and latch member 330 are formed in a Y-shaped configuration. First locking member 310 defines aperture 312 and second locking member 320 defines aperture 322. An aperture 332 is defined by latch member 330. Y-shaped arm 300 is slidably mounted onto base frame 150. Pin 160 on base frame 150 is received within aperture 332 of latch member 330. Y-shaped arm 300 also includes a solenoid aperture 334. Solenoid aperture 334 receives within it the shaft of solenoid assembly 800. The shaft of solenoid assembly 800 is always received within solenoid aperture 334, however, solenoid aperture 334 includes two steps within it such that when the shaft of solenoid assembly 800 is fully extended within solenoid aperture 334, Y-shaped arm 300 is locked into position and when the shaft of solenoid assembly 800 is partially retracted from solenoid aperture 334, Y-shaped arm 300 may be moved on frame 150. It is desirable for the shaft of solenoid assembly 800 to always extend within solenoid aperture 334 in order to provide for alignment of Y-shaped arm 300 on base frame 150. However, the two steps are provided within solenoid aperture 334 in order to permit both locking and movement of Y-shaped arm with the solenoid assembly shaft continuously extended into Y-shaped arm 300.

Control arm latch 400 includes a connecting member 410, a latch 430, and a spring 440. Pin 420 rigidly attaches connecting member 410 to Y-shaped arm 300. As will be further explained later in this specification, latch 430 releasably engages release trigger arm 500. Connecting member 410 is received through control arm latch mounting tab 170 of base frame 150.

Release trigger arm 500 is pivotally mounted to the internal end of support frame 100 by utilizing, for example, rivets. Release trigger arm 500 includes a first trigger 510 and a second trigger 520 which are formed as curved structures which extend up through first trigger aperture 130 and second trigger aperture 135, respectively, that are defined by support frame 100. Thus, first trigger 510 and second trigger 520, when a peripheral device is not inserted into device bay retention mechanism 10, extend up above the horizontal plane of support frame 100. On a forward end of release trigger arm 500 is included latch receiving structure 530. Latch receiving structure 530 includes latch retention member 535 which extends perpendicularly from latch receiving structure 530. Latch 430 of control arm latch 400 releasably engages latch retention member 535.

Release button 600 includes a spring 620 and is slidably received through frames 100 and 150. When release button 600 is depressed into device bay retention mechanism 10 by a user of the mechanism, the distal end 610 of release button 600 engages the actuator surface 340 of Y-shaped arm 300. The interaction of distal end 610 of release button 600 and actuator surface 340 of Y-shaped arm 300 serves to move Y-shaped arm 300 on base frame 150 into its unlocked position, as will be further explained. Spring 620 is utilized to return release button 600 to its fully extended position from device bay retention mechanism 10 when Y-shaped arm 300 has been moved to its locked position.

First locking arm 700 and second locking arm 750 are slidably received within support frame 100 and are operably associated with Y-shaped arm 300. First locking arm 700 includes retention tab 710 and second locking arm 750 includes retention tab 760. The retention tabs of each locking arm, when the locking arms are moved to their locked position, are received within locking arm receiving sockets 2042 (one of which can be seen in FIG. 4) that are included on each side of the device bay peripheral device 2040 that is to be retained in device bay retention mechanism 10 in order to lock the device bay peripheral device 2040 in the retention mechanism. First locking arm guide 120 and second locking arm guide 125 are included in support frame 100 in order to guide first locking arm 700 and second locking arm 750, respectively, within support frame 100. First locking arm guide 120 and second locking arm guide 125 can be snap-fitted into frame 100 and serve as guides for the movement of the locking arms within the support frame.

Each locking arm 700, 750 includes within it an aperture in the end of the locking arm that is opposite the retention tabs. The apertures in each locking arm, when the locking arms are inserted into support frame 100, align with the apertures 312 and 322 that are included in locking members 310, 320 of Y-shaped arm 300. Locking stud 720 rests on base frame 150 and extends up through aperture 312 in first locking member 310 and the aperture included in first locking arm 700 in order to operably couple first locking arm 700 to first locking member 310. Likewise, locking stud 770 also rests on top of base frame 150 and extends up through the aperture included in second locking arm 750 and aperture 322 included in second locking member 320 to operably couple second locking arm 750 to second locking member 320. Thus, each locking arm is operably coupled to Y-shaped arm 300. As can be understood, due to the configuration of locking members 310, 320 of Y-control arm 300 and the apertures that are defined by locking members 310, 320, as Y-shaped arm 300 is moved on a first, x-axis, of device bay retention mechanism 10, locking arms 700, 750 will move on a second, y-axis, which is perpendicular to the x-axis, of device bay retention mechanism 10.

As was mentioned previously, solenoid assembly 800 is mounted on base frame 150 and includes solenoid member 810, or shaft, and spring 820. Solenoid member 810 extends within solenoid aperture 334 of Y-shaped arm 300, as explained previously. Solenoid assembly 800 is electrically controlled to lock and unlock Y-shaped arm 300. In one embodiment, solenoid assembly 800 is connected to an electrical circuit that includes backplane PCB assembly 200, request switch 250, and LED assembly 260. In this embodiment, the solenoid assembly is controlled by the operator through request switch 250. Alternatively, solenoid assembly 800 can be controlled through a software application program installed in the computer with the user controlling the solenoid assembly by interacting with the software program, such as by selecting program icons with a mouse. Solenoid assembly 800 is a single directional solenoid. When energized, solenoid member 810 is partially retracted from solenoid aperture 334 in Y-shaped arm 300. When solenoid assembly 800 is de-energized, solenoid member 810 is fully extended within solenoid aperture 334 in order to lock Y-shaped arm 300 into position.

First ejection mechanism 900 and second ejection mechanism 950 are secured to rear structure 110 of support frame 100. First ejection mechanism 900 contains spring 910 and second ejection mechanism 950 includes spring 960.

Figure 7:
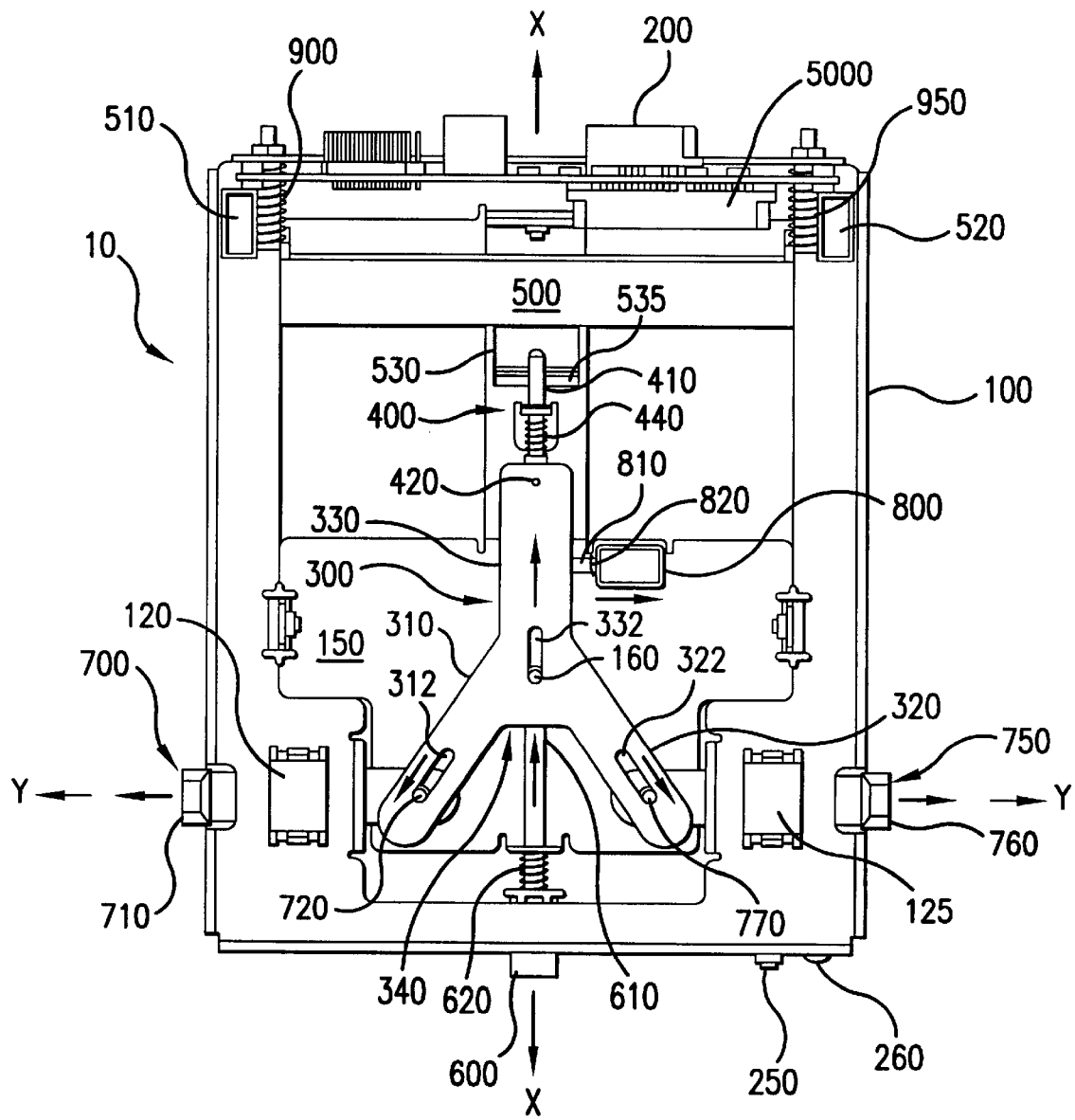
FIG. 7 is a top view of the device bay retention mechanism of FIG. 5 in an open or unlocked configuration.

The use and operation of device bay retention mechanism 10 will now be described with reference to FIGS. 7 and 8. FIG. 7 illustrates device bay retention mechanism 10 in an open, or unlocked, configuration where device bay retention mechanism 10 is ready to receive within it a peripheral device (not shown), such as device 2040 shown in FIG. 4. In order to place device bay retention mechanism 10 into its open configuration, a user would depress release button 600 into support frame 100. When release button 600 is inserted into support frame 100, distal end 610 of release button 600 contacts Y-shaped arm 300 at its actuator surface 340. The pressure applied by distal end 610 of release button 600 moves Y-shaped arm 300 in the direction as shown in FIG. 7, along the x-axis. Thus, Y-shaped arm 300 is moved further into the computer chassis. As Y-shaped arm 300 is moved, control arm latch 400 engages release trigger arm 500. Latch 430 of control arm latch 400 engages latch receiving structure 530 of release trigger arm 500. Even though latch 430 of control arm latch 400 is not visible in FIG. 7, it can be understood that as control arm latch 400 is forced into contact with latch receiving structure 530, latch 430 interacts with latch retention member 535 to pivot release trigger arm 500 such that latch 430 is able to slide under latch retention member 535 and be positioned on the far side of latch retention member 535, thus, coupling latch 430 to latch retention member 535. With control arm latch 400 coupled to release trigger arm 500, Y-shaped arm 300 is locked into this open configuration. In order to be able to move Y-shaped arm 300 into its open configuration, solenoid member 810 of solenoid assembly 800 is partially retracted from solenoid aperture 334 in Y-shaped arm 300. As can be seen, when solenoid member 810 is partially retracted from Y-shaped arm 300, spring 820 of solenoid assembly 800 is compressed.

Since first locking arm 700 and second locking arm 750 are operably connected to Y-shaped arm 300, when Y-shaped arm 300 is moved in the direction as shown in FIG. 7 (along x-axis), first locking arm 700 and second locking arm 750 are moved outward (on y-axis) from support frame 100 in the directions as indicated by the arrows. As can be seen in FIG. 7, locking stud 720, which interconnects first locking arm 700 to first locking member 310, and second locking stud 770, which interconnects second locking arm 750 to second locking member 320, have been moved such that they are now in the external-most location in the apertures defined by the respective locking members of Y-shaped arm 300. The arrows on the locking members of Y-shaped arm 300 in FIG. 7 indicate the relative direction of movement of the locking studs with respect to the locking members. Thus, the movement of Y-shaped arm 300 in a direction toward the rear of support frame 100 causes the locking arms to extend outwardly from support frame 100 such that a peripheral device may be inserted into device bay retention mechanism 10.

Figure 8:
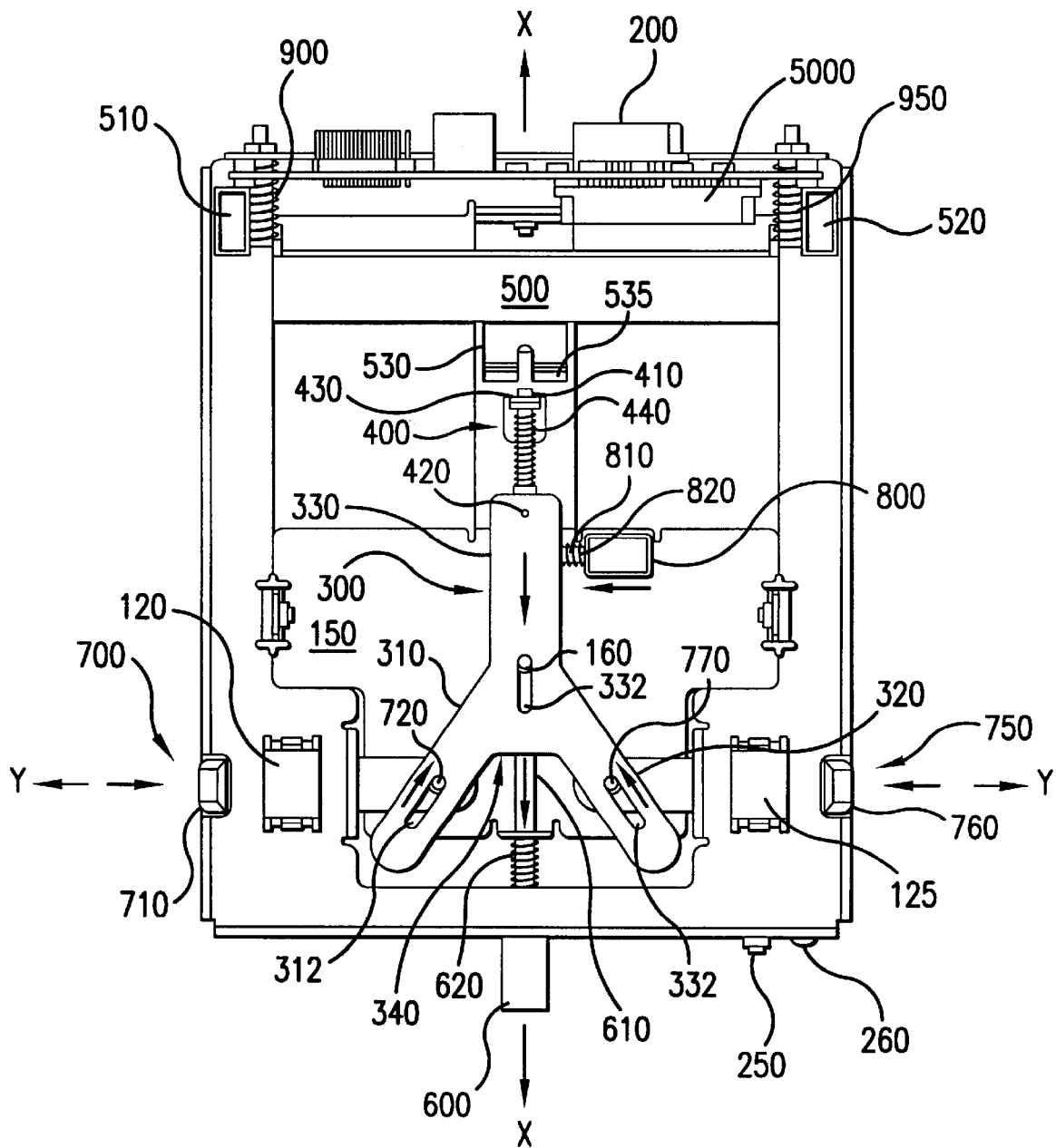
FIG. 8 is a top view of the device bay retention mechanism of FIG. 5 in a locked configuration.

FIG. 8 illustrates device bay retention mechanism 10 in its locked configuration where a peripheral device would be locked within the device bay retention mechanism. For purposes of clarity, the peripheral device is not illustrated, however, the interaction of the peripheral device and the retention mechanism 10 will be described. With device bay retention mechanism 10 in the unlocked configuration as illustrated in FIG. 7, a peripheral device would be inserted into device bay retention mechanism 10. As the peripheral device is inserted into device bay retention mechanism 10, the peripheral device would contact first trigger 510 and second trigger 520 of release trigger arm 500. The contacting of the peripheral device with triggers 510 and 520 will pivot release trigger arm 500, and consequently latch receiving structure 530, in an upward direction which will release latch 430 of control arm latch 400 from contact with latch receiving structure 530. The releasing of control arm latch 400 from release trigger arm 500 will result in Y-shaped arm 300 moving in the direction as indicated in FIG. 8 toward the external end of device bay retention mechanism 10. Y-shaped arm 300 is forced in this direction by spring 440 of control arm latch 400. The movement of Y-shaped arm 300 in this direction also forces release button 600 in a more external position from device bay retention mechanism 10.

However, more importantly, the movement of Y-shaped arm 300 also causes first locking arm 700 and second locking arm 750 to move inward toward support frame 100. With first locking arm 700 and second locking arm 750 moved to this position, retention tab 710 of first locking arm 700 and retention tab 760 of second locking arm 750 are received within the sockets that are included on the peripheral device. Thus, the peripheral device is locked within device bay retention mechanism 10. Again, as can be understood, the movement of Y-shaped arm 300 in the direction as illustrated in FIG. 8 will cause the locking arms to move inwardly toward support frame 100. As can be seen in FIG. 8, first locking stud 720 and second locking stud 770 have now been moved relative to Y-shaped arm 300 such that they are in an inner-most location within the apertures that are defined within the locking members of Y-shaped arm 300.

When the peripheral device is inserted into device bay retention mechanism 10, the peripheral device is electrically connected into device bay backplane PCB assembly 200, through device bay connector 5000. Thus, backplane PCB assembly 200, and consequently the computer, senses the connection of the peripheral device within the computer. Upon sensing the insertion of the peripheral device within the computer, a signal is sent to solenoid assembly 800 in order to de-energize assembly 800, thus fully extending solenoid member 810 within Y-shaped arm 300. This full extension of solenoid member 810 of solenoid assembly 800 into Y-shaped arm 300 will lock Y-shaped arm 300 in this position which will in-turn lock first and second locking arms 700, 750 into their locked configuration with respect to the peripheral device. Thus, the peripheral device is locked within device bay retention mechanism 10 and cannot be removed without interaction by a user.

In order to remove a peripheral device from device bay retention mechanism 10, in one embodiment, a user would depress ejection request switch 250 which is electrically connected to a circuit that includes solenoid assembly 800 and may include backplane assembly 200. The electrical circuit processes the request and reports a ready state to the user through dual-state LED 260. The electrical circuit electrically energizes solenoid assembly 800 in order to partially retract solenoid member 810 from Y-shaped arm 300. The user would then manually depress release button 600 to move Y-shaped arm 300 to engage control arm latch 400 with release trigger arm 500, as described previously. This movement of Y-shaped arm 300 in-turn moves first locking arm 700 and second locking arm 750 outwardly from support frame 100 which disengages the locking arms from the peripheral device. Once locking arms 700, 750 have been disengaged from the peripheral device, ejection mechanisms 900 and 950 partially eject the peripheral device from device bay retention mechanism 10 such that the user may grasp the now protruding peripheral device with his/her hands and completely remove the peripheral device from the computer.

Ejection mechanisms 900 and 950 eject the peripheral device from device bay retention mechanism 10 by utilizing the biasing springs that are included in each ejection mechanism. Once the peripheral device has been removed from device bay retention mechanism 10, device bay retention mechanism 10 remains in its unlocked configuration, as illustrated in FIG. 7, ready to receive another peripheral device within it.

In order to ensure that a peripheral device that is inserted into device bay retention mechanism 10 remains in contact with device bay retention mechanism 10 such that it can be locked into the mechanism, it may be desirable to provide a mechanism to exert a downward pressure on the peripheral device. There are a number of different mechanical devices that could be utilized for exerting this downward pressure and the present invention is not limited to any particular embodiment for exerting this downward force. For example, a leaf spring could be installed within the device bay such that the leaf spring would apply the downward force on the peripheral device. The leaf spring would provide sufficient biasing pressure against the peripheral device such that the peripheral device would remain in contact with the device bay retention mechanism, however, the leaf spring would not hinder a user when inserting a peripheral device into the device bay and the device bay retention mechanism.

It is intended that the device bay retention mechanism be implemented into, but not be limited to, traditional mini-tower, mid-tower, and desk-top computer systems. The device bay retention mechanism could be implemented into future system designs of network servers as well as future designs of non-traditional and/or emerging categories of computer technology.

Whereas the present invention was described as being incorporated into a modified device bay, the present invention is not limited to only being incorporated in a modified device bay. It is also possible to include rails within existing 5¼ inch peripheral bays for accommodating the device bay retention mechanism.

The disclosed embodiments are illustrative of the various ways in which the present invention may be practiced. Other embodiments can be implemented by those skilled in the art without departing from the spirit and scope of the present invention.

What is claimed is:

1. A computer peripheral device retention apparatus comprising:
   a frame;
   a control arm slidably coupled to said frame;
   first and second locking arms operably coupled to said control arm;
   a release button, said release button received within said frame and in operable association with said control arm;
   a release trigger arm pivotally attached to said frame;
   a control arm latch connected to said control arm at a first end and releasably coupleable to said release trigger arm at a second end;
   an ejection mechanism attached to a rear end of said frame; and
   a solenoid assembly releasably coupled to said control arm.

2. The computer peripheral device retention apparatus of claim 1 wherein said control arm includes:
   a latch member;
   a first locking member extending from a first end of said latch member; and
   a second locking member extending from said first end of said latch member;
   said latch member and said first and second locking members formed in a Y-shaped configuration.

3. The computer peripheral device retention apparatus of claim 1 wherein said control arm moves on a first axis with respect to said frame and said first and second locking arms move on a second axis with respect to said frame, said first axis perpendicular to said second axis.

4. The computer peripheral device retention apparatus of claim 1 wherein said ejection mechanism includes first and second springs.

5. The computer peripheral device retention apparatus of claim 1 wherein said release trigger arm includes a first trigger and a second trigger, said first and second triggers extending up through first and second apertures, respectively, defined by said frame.

6. The computer peripheral device retention apparatus of claim 1 wherein said release trigger arm includes a latch receiving structure and a latch retention member, said latch retention member extending perpendicular from said latch receiving structure.

7. The computer peripheral device retention apparatus of claim 1 wherein said control arm latch includes:

a cylindrical connecting member;

a spring disposed on said connecting member; and a latch, said latch disposed through an end of said connecting member and extending perpendicular to said connecting member.

8. The computer peripheral device retention apparatus of claim 2 wherein said first locking member, said second locking member, said first locking arm and said second locking arm all define apertures therein and wherein a first locking stud extends within said apertures defined by said first locking member and said first locking arm and a second locking stud extends within said apertures defined by said second locking member and said second locking arm.

9. A computer housing comprising:

an enclosure;

a peripheral device bay included within said enclosure;

a retention mechanism, said retention mechanism attached within said peripheral device bay and including:

a frame;

a Y-shaped control arm slidably coupled to said frame;

first and second locking arms operably coupled to said Y-shaped control arm for relative movement between said first and second locking arms and said Y-shaped control arm;

a release button operably coupled to said Y-shaped control arm at a first end of said Y-shaped control arm;

a release trigger arm operably coupled to said Y-shaped control arm at a second end of said Y-shaped control arm; and an ejection mechanism attached to said frame.

10. The computer housing of claim 9 further comprising:

a solenoid assembly releasably coupled to said Y-shaped control arm.

11. The computer housing of claim 9 wherein a control arm latch operably couples said release trigger arm to said Y-shaped control arm.

12. The computer housing of claim 11 wherein said control arm latch includes:

a cylindrical connecting member;

a spring disposed on said connecting member; and a latch, said latch disposed through an end of said connecting member and extending perpendicular to said connecting member.

13. The computer housing of claim 9 wherein said release trigger arm includes:

a first trigger and a second trigger, said first and second triggers extending up through a first aperture and a second aperture, respectively, defined by said frame;

a latch receiving structure; and a latch retention member, said latch retention member extending perpendicular from said latch receiving structure.

14. A method for installing a peripheral computer device within a computer enclosure comprising:

inserting a peripheral computer device into a retention mechanism;

depressing a release trigger arm by said peripheral computer device;

releasing a control arm latch, said control arm latch operably coupled to said release trigger arm;

sliding a Y-shaped control arm in a direction away from said release trigger arm, said Y-shaped control arm attached to said control arm latch;

moving a first locking arm relative to said Y-shaped control arm to engage said peripheral computer device; and moving a second locking arm relative to said Y-shaped control arm to engage said peripheral computer device;

said first and second locking arms operably coupled to said Y-shaped control arm.

15. The method of claim 14 further comprising:

de-energizing a solenoid assembly; and locking said Y-shaped control arm with said solenoid assembly.

16. The method of claim 14 wherein said releasing said control arm latch includes pivoting said release trigger arm by said peripheral computer device.

17. The method of claim 14 wherein said Y-shaped control arm moves on a first axis and said first and second locking arms move on a second axis, said first axis perpendicular to said second axis.

18. A method for removing a peripheral computer device from a retention mechanism, the retention mechanism installed within a computer enclosure, comprising:

sliding a Y-shaped control arm to engage a release trigger arm;

moving a first locking arm relative to said Y-shaped control arm to disengage said first locking arm from the peripheral computer device;

moving a second locking arm relative to said Y-shaped control arm to disengage said second locking arm from the peripheral computer device;

said first and second locking arms operably coupled to said Y-shaped control arm; and partially ejecting the peripheral computer device from the retention mechanism.

19. The method of claim 18 further comprising disengaging a solenoid assembly from said Y-shaped control arm.

20. The method of claim 18 wherein of sliding said Y-shaped control arm includes contacting said control arm with a release button.

21. The method of claim 18 wherein said control arm moves on a first axis and said first and second locking arms move on a second axis, said first axis perpendicular to said second axis.

22. The method of claim 18 wherein said step of partially ejecting the peripheral computer device from the retention mechanism includes decompressing a first and a second spring.

* * * * *